(12) United States Patent
Lee et al.

(10) Patent No.: US 10,990,523 B2
(45) Date of Patent: Apr. 27, 2021

(54) MEMORY CONTROLLER AND OPERATING METHOD THEREOF

(71) Applicant: Samsung Electronics Co., Ltd., Suwon-si (KR)

(72) Inventors: Jeong-ho Lee, Gwacheon-si (KR); Young-sik Kim, Suwon-si (KR); Eun-chu Oh, Hwaseong-si (KR); Young-kwang Yoo, Yongin-si (KR); Young-geun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 16/445,005

(22) Filed: Jun. 18, 2019

(65) Prior Publication Data
US 2020/0073799 A1 Mar. 5, 2020

(30) Foreign Application Priority Data
Sep. 3, 2018 (KR) .................. 10-2018-0104780

(51) Int. Cl.
*G06F 12/06* (2006.01)
*G06F 1/32* (2019.01)
*G06F 3/06* (2006.01)
*G06F 12/02* (2006.01)

(52) U.S. Cl.
CPC ............ *G06F 12/0607* (2013.01); *G06F 1/32* (2013.01); *G06F 3/064* (2013.01); *G06F 3/0625* (2013.01); *G06F 3/0679* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 7,471,556 B2 | 12/2008 | Chow et al. | |
| 7,889,544 B2 | 2/2011 | Chow et al. | |
| 7,911,824 B2 | 3/2011 | Kawai et al. | |
| 8,570,828 B2 | 10/2013 | Pyeon | |
| 8,848,465 B2 | 9/2014 | Kim et al. | |
| 9,153,332 B2 | 10/2015 | Lee et al. | |
| 9,691,477 B2 | 6/2017 | Oh et al. | |
| 9,727,267 B1* | 8/2017 | Sebastian | G06F 3/0659 |
| 2002/0019890 A1* | 2/2002 | Chiu | G11C 7/1087 710/6 |
| 2010/0199025 A1 | 8/2010 | Nanjou et al. | |
| 2014/0016397 A1 | 1/2014 | Lee et al. | |
| 2017/0329547 A1* | 11/2017 | Jeon | G06F 1/3275 |
| 2019/0065086 A1* | 2/2019 | Margetts | G06F 3/0659 |

\* cited by examiner

*Primary Examiner* — Jared I Rutz
*Assistant Examiner* — Marwan Ayash
(74) *Attorney, Agent, or Firm* — Muir Patent Law, PLLC

(57) ABSTRACT

A memory controller configured to control a memory device including a plurality of banks. The memory controller may determine whether a number of write commands enqueued in a command queue of the memory controller exceeds a reference value, calculate a level of write power to be consumed by the memory device in response to at least some of the write commands from among the enqueued write commands when the number of enqueued write commands exceeds the reference value, and schedule, based on the calculated level of write power, interleaving commands executing an interleaving operation of the memory device, from among the enqueued write commands.

17 Claims, 12 Drawing Sheets

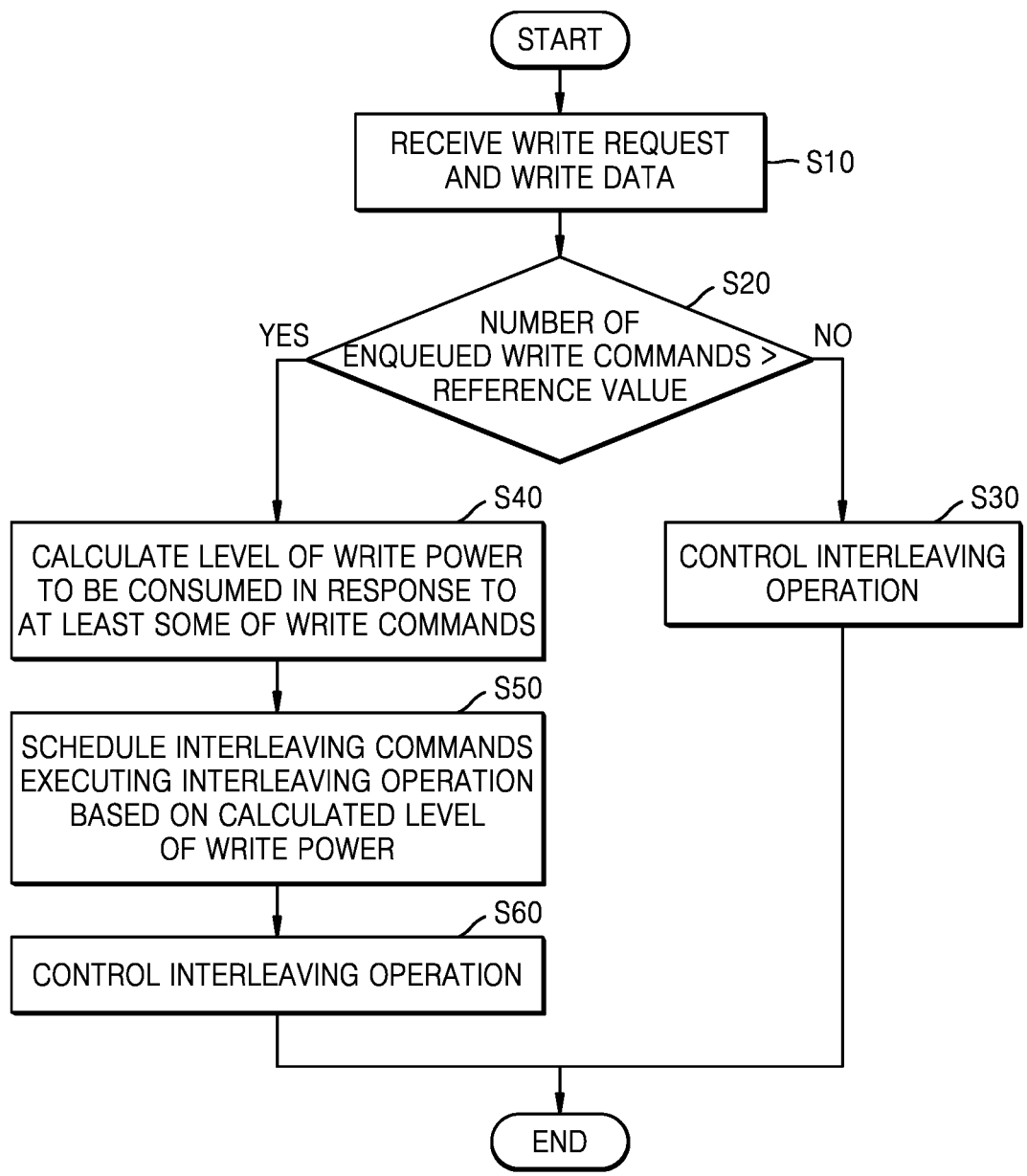

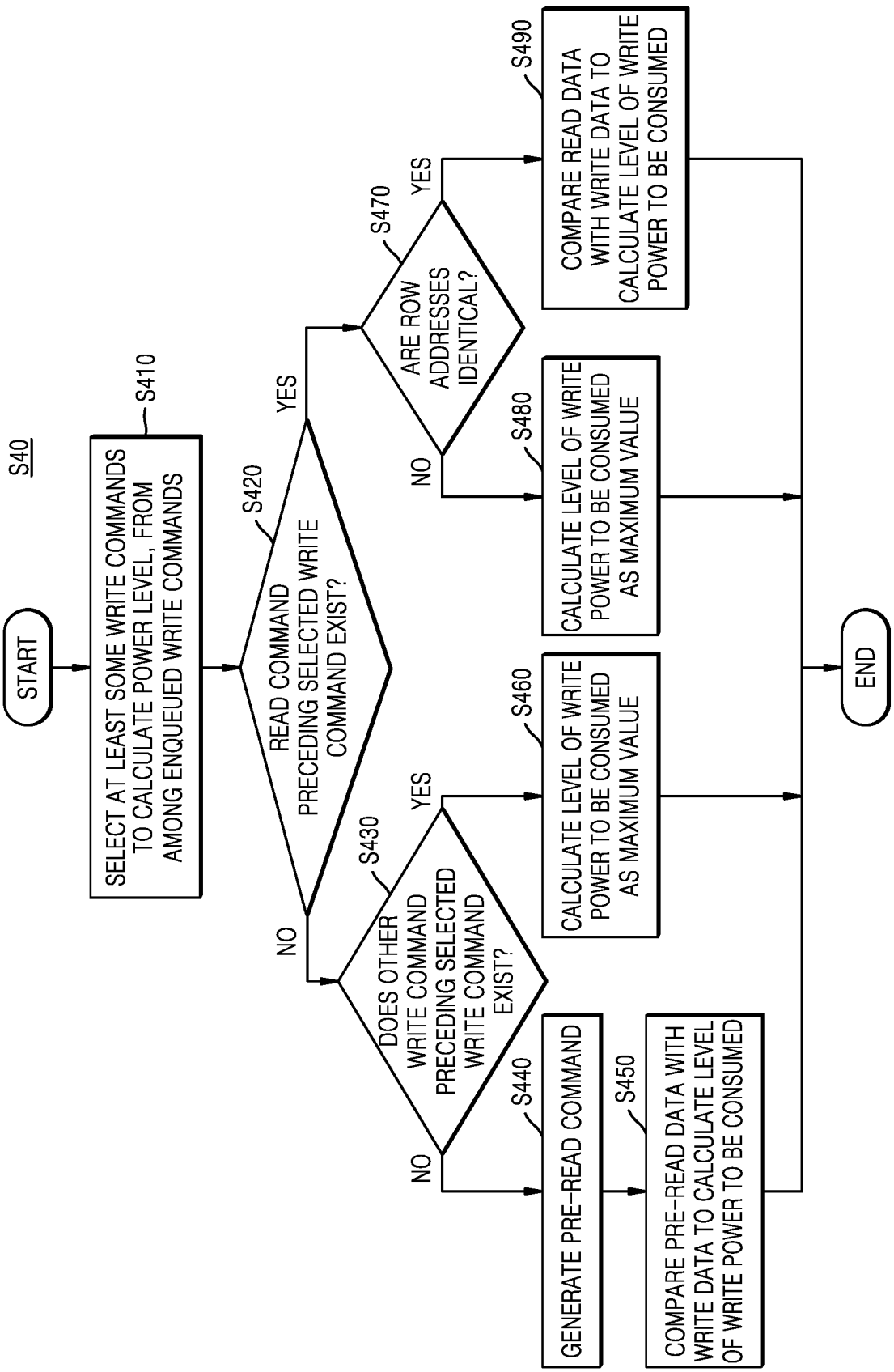

FIG. 8A

| Write Command | Target Bank | | Read Command | Target Bank |
|---|---|---|---|---|
| WCMD0 | Bank0 | | RCMD0 | Bank5 |
| WCMD1 | Bank1 | | RCMD1 | Bank6 |
| WCMD2 | Bank2 | | | |
| WCMD3 | Bank3 | | | |
| WCMD4 | Bank4 | | | |
| WCMD5 | Bank0 | | | |
| WCMD6 | Bank6 | | | |
| WCMD7 | Bank7 | | | |
| WCMD8 | Bank8 | | | |
| WCMD9 | Bank9 | | | |

| | Read Command | Target Bank |
|---|---|---|
| WCMD4 ──▶ | pre-RCMD0 | Bank4 |
| WCMD7 ──▶ | pre-RCMD1 | Bank7 |
| WCMD8 ──▶ | pre-RCMD2 | Bank8 |
| WCMD9 ──▶ | pre-RCMD3 | Bank9 |

| Write Command | Target Bank | Write power level (1~8) |
|---|---|---|
| WCMD0 | Bank0 | 8 |
| WCMD1 | Bank1 | 8 |
| WCMD2 | Bank2 | 8 |
| WCMD3 | Bank3 | 8 |
| WCMD4 | Bank4 | 3 |
| WCMD5 | Bank0 | 8 |
| WCMD6 | Bank6 | 6 |
| WCMD7 | Bank7 | 4 |
| WCMD8 | Bank8 | 4 |
| WCMD9 | Bank9 | 3 |

| Write Command | Target Bank |
|---|---|
| WCMD0 | Bank0 |
| WCMD1 | Bank1 |
| WCMD2 | Bank2 |
| WCMD3 | Bank3 |
| WCMD4 | Bank4 |
| WCMD7 | Bank7 |
| WCMD8 | Bank8 |
| WCMD9 | Bank9 |
| WCMD6 | Bank6 |
| WCMD5 | Bank0 |

MEMORY CONTROLLER AND OPERATING METHOD THEREOF

CROSS-REFERENCE TO RELATED APPLICATION

This application claims the benefit of Korean Patent Application No. 10-2018-0104780, filed on Sep. 3, 2018, in the Korean Intellectual Property Office, the disclosure of which is incorporated herein in its entirety by reference.

BACKGROUND

The inventive concept relates to a memory device, and more particularly, to a memory controller for controlling a memory device and an operating method of the memory controller.

As a non-volatile memory device, resistive memory devices such as a phase-change random access memory (PRAM), a resistive random access memory (RRAM), and a magnetic random access memory (MRAM) have used a variable resistance element that stores data by a change of resistance state as a memory cell. A commonality of materials of the resistive memory devices is that a resistance value varies according to a size and/or direction of a current or voltage, and the materials have a non-volatile characteristic that maintains the resistance value even when the current or voltage is blocked.

In recent years, fields using a large amount of data such as image processing and big data processing have increased, so increasing data processing speed has been important. As a method used to increase the data processing speed of a memory device, a bank interleaving technique controlling data to use a plurality of banks simultaneously is being used. Therefore, the data processing speed may be improved as compared with a case of using a single bank.

SUMMARY

The inventive concept provides a memory controller capable of controlling a number of banks which may be used simultaneously according to a power consumption level of a write operation, and an operation method thereof.

According to an aspect of the inventive concept, there is provided an operating method of a memory controller for controlling a memory device including a plurality of banks, the operating method including: determining whether a number of write commands enqueued in a command queue of the memory controller exceeds a reference value, calculating a level of write power to be consumed by the memory device in response to at least some of the write commands from among the enqueued write commands in response to the number of enqueued write commands exceeding the reference value, and scheduling, based on the calculated level of write power, interleaving commands executing a first interleaving operation of the memory device, from among the enqueued write commands.

According to another aspect of the inventive concept, there is provided a memory controller for controlling an interleaving operation of a memory device including a plurality of banks, the memory controller including: a power level calculator configured to calculate a level of write power to be consumed in the memory device in response to at least some of the plurality of write commands to be provided to the memory device, and a command scheduler configured to schedule, based on the calculated level of write power, interleaving commands executing an interleaving operation of the memory device, from among the plurality of write commands, wherein the power level calculator calculates the level of write power in response to a number of the plurality of write commands exceeding a reference value.

According to another aspect of the inventive concept, there is provided a memory system, including: a memory device including a plurality of banks and configured to perform a data comparison write operation, and a memory controller configured to control an interleaving operation of the memory device, wherein the memory controller includes a power level calculator configured to calculate a level of write power to be consumed in the memory device in response to at least some of a plurality of write commands to be provided to the memory device, and a command scheduler configured to schedule, based on the calculated level of write power, interleaving commands executing an interleaving operation of the memory device, from among the plurality of write commands, wherein the power level calculator calculates the level of write power in response to a number of the plurality of write commands exceeding a reference value.

BRIEF DESCRIPTION OF THE DRAWINGS

Embodiments of the inventive concept will be more clearly understood from the following detailed description taken in conjunction with the accompanying drawings in FIG. 1 is a block diagram illustrating a memory system according to example embodiments;

FIG. 6 is a flowchart illustrating an operating method of a memory controller according to an example embodiment;

FIG. 7 is a flowchart illustrating an operating method of a memory controller according to an example embodiment;

FIG. 8A is a table illustrating example embodiments of a command queue in FIG. 5;

FIG. 8B is a table illustrating example embodiments of a command queue in which pre-read commands are enqueued;

FIG. 9 is a diagram explaining an example embodiment of S30 in FIG. 6 and S40 in FIG. 7;

DETAILED DESCRIPTION OF THE EMBODIMENTS

Hereinafter, embodiments of the inventive concept will now be described in detail with reference to the accompanying drawings.

Figure 1:
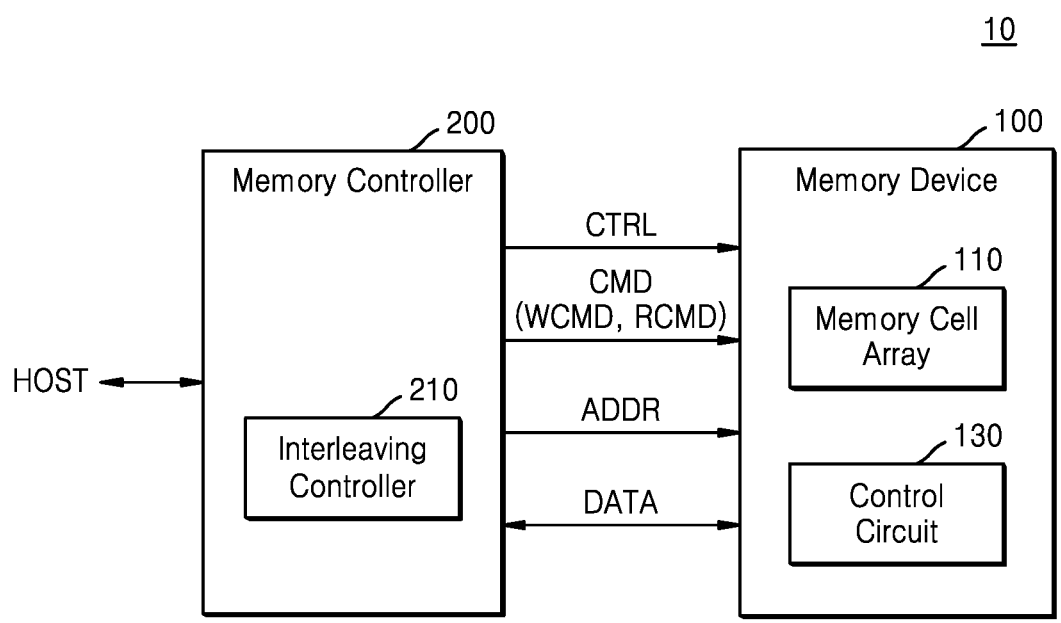

FIG. 1 is a block diagram illustrating a memory system 10 according to example embodiments.

Referring to FIG. 1, the memory system 10 may include a memory device 100 and a memory controller 200.

The memory controller 200 may control the memory device 100 to write data to the memory device 100 or to read data stored in the memory device 100 in response to a write/read request from a host HOST. For example, the memory controller 200 may provide an address ADDR, a command CMD (e.g., a write command WCMD and a read command RCMD), and a control signal CTRL to the memory device 100 to control a program (or an entry) and a read operation with respect to the memory device 100. Furthermore, data to be written DATA and read data DATA may be transmitted and received between the memory controller 200 and the memory device 100.

The memory device 100 may include a memory cell array 110 and a control circuit 130. The memory cell array 110 may include a plurality of memory cells MC respectively arranged in regions where a plurality of first signal lines and a plurality of second signal lines intersect. In an embodiment, the plurality of first signal lines may be a plurality of word lines, and the plurality of second signal lines may be a plurality of bit lines. In another embodiment, the plurality of first signal lines may be a plurality of bit lines, and the plurality of second signal lines may be a plurality of word lines.

In an embodiment, the plurality of memory cells MC may include resistive memory cells including a variable resistance element. For example, when the variable resistance element is a phase-change material Ge—Sb—Te (GST) and a resistance varies according to temperature, the memory device 100 may be a phase-change memory (PRAM). For example, when the variable resistance element includes an upper electrode, a lower electrode, and a complex metal oxide between the upper electrode and the lower electrode, the memory device 100 may be the PRAM. For example, when the variable resistance element includes an upper electrode of a magnetic substance, a lower electrode of a magnetic substance, and a dielectric between the upper electrode and the lower electrode, the memory device 100 may be a magnetoresistive or magnetic random access memory (MRAM). Therefore, the memory device 100 may be referred to as a resistive memory device, and the memory system 10 may be referred to as a resistive memory system.

In an embodiment, each of the plurality of memory cells MC may be a single-level cell (SLC) capable of storing one bit of data. At this time, the memory cells MC may have two different resistance distributions depending on stored data. In an embodiment, each of the plurality of memory cells MC may be a multi-level cell (MLC) capable of storing two bits of data. At this time, the memory cells MC may have four resistance distributions depending on stored data. In an embodiment, each of the plurality of memory cells MC may be a triple-level cell (TLC) capable of storing three bits of data. At this time, the memory cells MC may have eight resistance distributions depending on stored data. However, the inventive concept is not limited thereto. In an embodiment, the memory cell array 110 may include memory cells MC capable of respectively storing four or more bits of data. The memory cell array 110 may include the SLC, the MLC, or the TLC together.

The control circuit 130 may control operations of the memory device 100. In the present embodiment, the control circuit 130 may control a voltage level or a timing of voltages applied to the first signal lines and the second signal lines connected to the memory cell array 110. Here, the voltages may include operation voltages applied to selected first and second signal lines and inhibit voltages applied to non-selected first and second signal lines.

The memory controller 200 may include an interleaving controller 210. When data is written to the memory device 100, the interleaving controller 210 may control to perform an interleaving operation. For example, the interleaving controller 210 may calculate a power level to be consumed in advance when writing data to different banks at the same time. The interleaving controller 210 may determine, based on the calculated power level to be consumed, a number of write commands WCMD corresponding to the interleaving operation and select the write commands WCMD corresponding to the interleaving operation. Therefore, according to an operating method of the memory device 100 according to the inventive concept, a number of banks accessible to be used at the same time may be increased by controlling the interleaving operation efficiently, and time taken to perform a write operation may be reduced.

Figure 2:
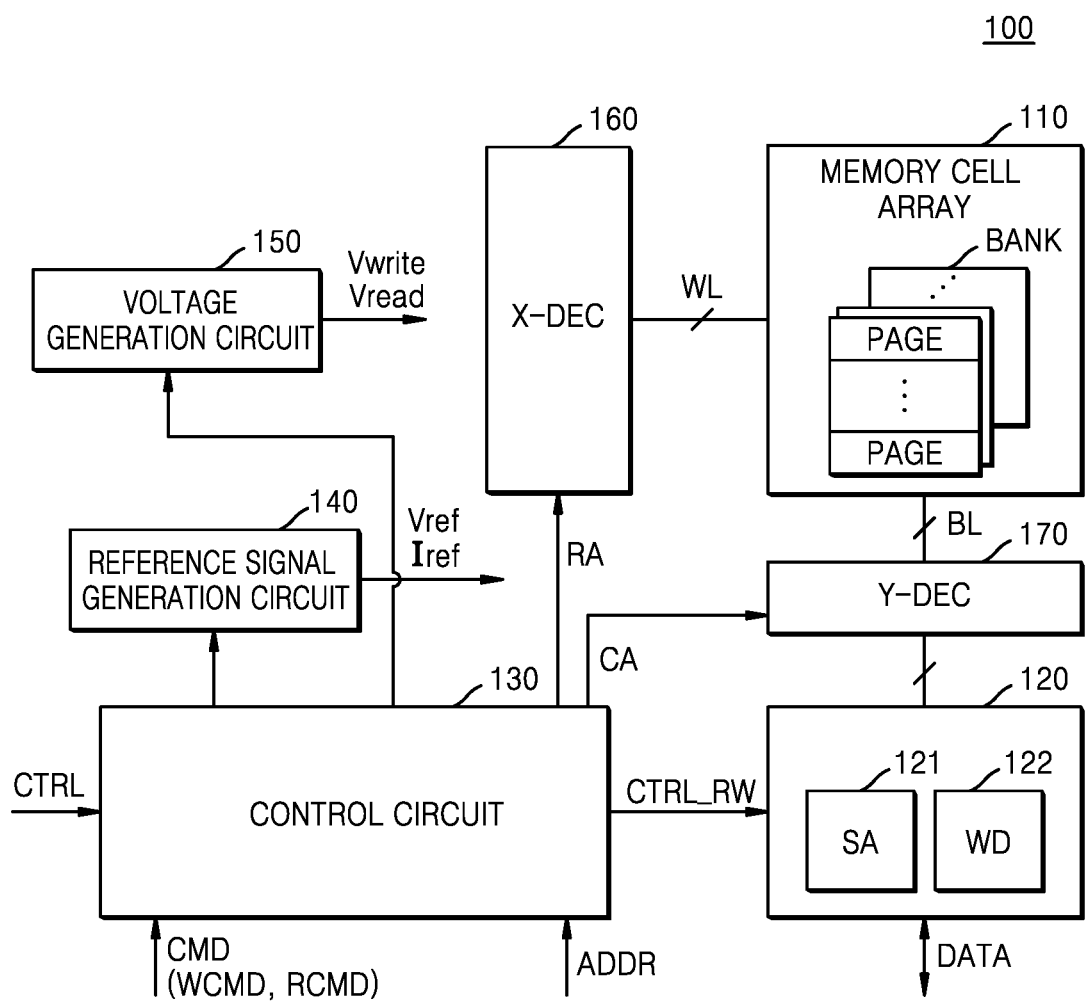
FIG. 2 is a block diagram illustrating an example of a memory device included in the memory system in FIG. 1 according to example embodiments.

FIG. 2 is a block diagram illustrating an example of the memory device 100 included in the memory system 10 in FIG. 1.

Referring to FIG. 2, the memory device 100 may include the memory cell array 110, a write/read circuit 120, the control circuit 130, a reference signal generation circuit 140, a voltage generation circuit 150, a row decoder (X-DEC) 160, and a column decoder (Y-DEC) 170, wherein the write/read circuit 120 may include a sense amplifier (SA) 121 and a write driver (WD) 122.

Memory cells MC included in the memory cell array 110 may be connected to a plurality of first signal lines and a plurality of second signal lines. In an embodiment, the plurality of first signal lines may be a plurality of word lines WL, and the plurality of second signal lines may be a plurality of bit lines BL. As various kinds of voltage signals or current signals are provided through the plurality of word lines WL and the plurality of bit lines BL, data is written or read with respect to selected memory cells MC, while writing or reading with respect to remaining non-selected memory cells MC may be prevented from being performed.

The memory cells MC included in the memory cell array 110 may be divided into different banks BANK. Each bank BANK may include a plurality of pages PAGE, wherein one page PAGE may indicate memory cells MC having the same row address RA in the bank BANK. The bank BANK may be a unit in which an interleaving operation is performed, and the page PAGE may be a unit in which a read or write operation is performed.

An address ADDR instructing a memory cell MC to be accessed along with a command CMD may be received in the memory device 100, wherein the address ADDR may include a row address RA selecting the word lines WL of the memory cell array 110 and a column address CA selecting the bit lines BL of the memory cell array 110. The row decoder 160 may respond to the row address RA to perform a word line selection operation. The column decoder 170 may respond to the column address CA to perform a bit line selection operation.

The write/read circuit 120 may be connected to the first signal lines and/or the second signal lines of the memory cell array 110 to write data to the memory cell MC or to read data from the memory cell MC. The voltage generation circuit 150 may generate a write voltage Vwrite used to perform a write operation and generate a read voltage Vread performing a read operation. The write voltage Vwrite may include a set pulse and a reset pulse as various voltages related to the write operation. The write voltage Vwrite and the read voltage Vread may be provided to the bit lines BL via the column decoder 170 or may be provided to the word lines WL via the row decoder 160.

The reference signal generation circuit 140 may generate a reference voltage Vref and a reference current Iref as various reference signals related to a data read operation. For example, the sense amplifier 121 may be connected to one node (for example, a sensing node) of the bit line BL to distinguish between data. The sense amplifier 121 may distinguish between data values via a comparison operation with respect to a voltage and the reference voltage Vref at the sensing node. Alternatively, when a current sensing method is applied, the reference signal generation circuit 140 may generate the reference current Iref and provide the reference current Iref to the memory cell array 110. The data value may be distinguished by comparing the voltage and the reference voltage Vref of the sensing node due to the reference current Iref.

The write/read circuit 120 may provide the distinguished result with respect to the data read and written to the control circuit 130. The control circuit 130 may control write and read operations of the memory cell array 110 with reference to the distinguished result.

The control circuit 130 may output various control signals CTRL_RW to write data to the memory cell array 110 or to read data from the memory cell array 110, based on the command CMD, address ADDR, and the control signal CTRL received from the memory controller 200. The control circuit 130 may generally control various operations in the memory device 100.

The control circuit 130 may perform an interleaving operation with respect to different banks BANK included in the memory cell array 110. When the control circuit 130 performs the interleaving operation with respect to a first bank BANK and a second bank BANK, a word line addressing of the first bank BANK and the second bank BANK may be changed.

The control circuit 130 may perform a data compare write (DCW) operation. When the control circuit 130 receives the write command WCMD and the write data from the memory controller 200, the control circuit 130 may compare existing data stored in an address corresponding to the write command WCMD with the write data and perform an overwrite operation only with respect to a memory cell MC having data different from the existing data in the write data. For example, when the existing data is '00000000' and the write data is '00000001', the overwrite operation may be performed only with respect to the memory cell MC corresponding to the eighth bit. Therefore, the closer the similarity between the data already stored and data to be written, that is, the smaller the number of memory cells MC having different data from one another, the lower the power consumed when the write operation is performed.

Figure 3:
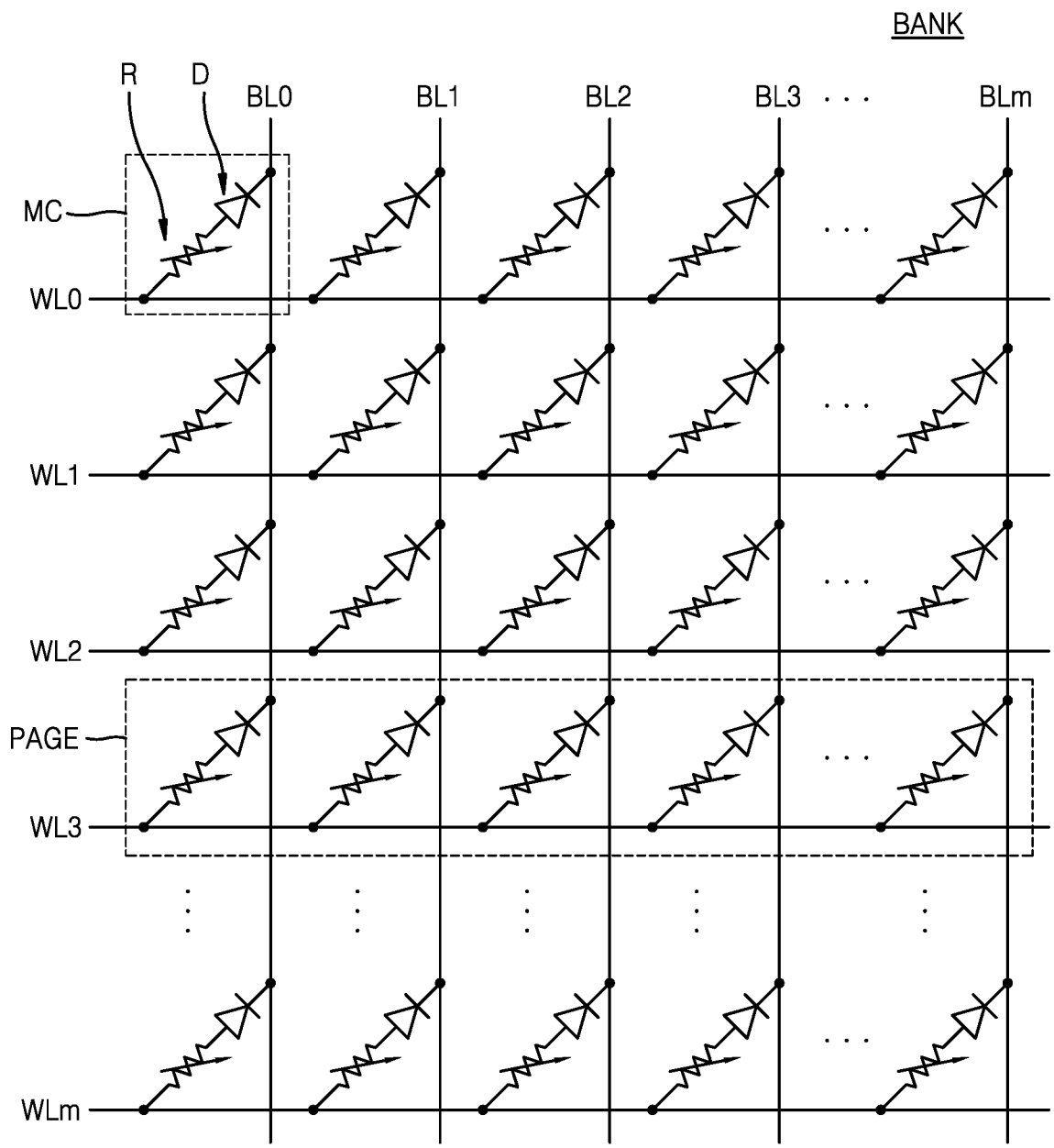
FIG. 3 is a circuit diagram of an example embodiment of a memory cell array in FIG. 2.

FIG. 3 is a circuit diagram of an example embodiment of the memory cell array 110 in FIG. 2. The memory cell array 110 may include a plurality of banks BANK, and FIG. 3 may show one bank BANK.

Referring to FIG. 3, the bank BANK may include a plurality of memory cells MC. Here, a number of word lines WL, a number of bit lines BL, which are connected to the plurality of memory cells MC and a number of memory cells MC may be variously changed according to example embodiments. Although the number of word lines WL is shown as being equal to the number of bit lines BL in FIG. 3, the present embodiment is not limited thereto. The number of word lines WL may be different from the number of bit lines BL. The bank BANK may include a plurality of pages PAGE. One page PAGE may indicate memory cells MC connected to the same word line WL in the bank BANK.

According to an embodiment, each of the plurality of memory cells MC may include a variable resistance R and a selecting element D. Here, the variable resistance R may be referred to as a variable resistance element or a variable resistance material. The selecting element D may be referred to as a switching element.

In an embodiment, the variable resistance R may be connected between one of a plurality of bit lines BL0 to BLm and the selecting element D. The selecting element D may be connected between one of a plurality of word lines WL0 to WLm and the variable resistance R. However, the present embodiment is not limited thereto. The selecting element D may be connected between one of the plurality of bit lines BL0 to BLm and the variable resistance R. The variable resistance R may be connected between one of the plurality of word lines WL0 to WLm and the selecting element D.

The selecting element D may be connected between one of the plurality of word lines WL0 to WLm and the variable resistance R and may control a supply of current to the variable resistance R according to a voltage applied to the connected word line WL and the bit line BL. In an embodiment, the selecting element D may be a PN junction or a PIN junction diode, wherein an anode of the diode may be connected to the variable resistance R and a cathode of the diode may be connected to one of the plurality of bit lines BL0 to BLm. At this time, when a voltage difference between the anode and the cathode of the diode is greater than a threshold voltage of the diode, the diode may be turned on and a current may be supplied to the variable resistance R.

Figure 4A:
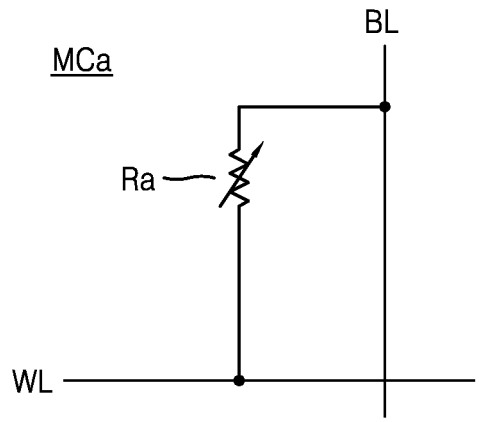
FIGS. 4A to 4C are circuit diagrams illustrating examples of variations of a memory cell in FIG. 3.
Figure 4B:
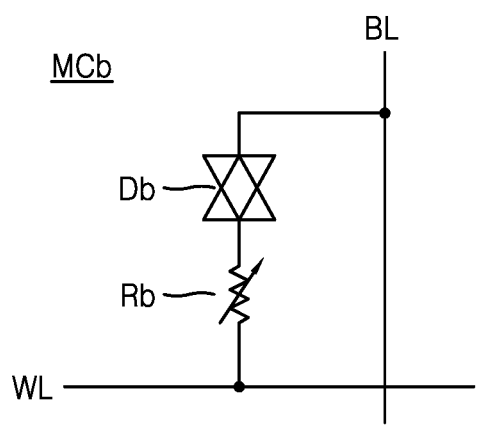
Figure 4C:
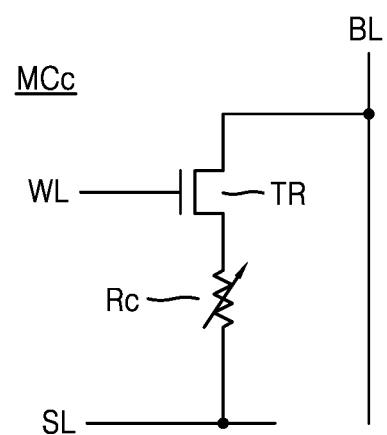

FIGS. 4A to 4C are circuit diagrams illustrating examples of variations of the memory cell MC in FIG. 3.

Referring to FIG. 4A, a memory cell MCa may include a variable resistance Ra and the variable resistance Ra may be connected between the bit line BL and the word line WL. The memory cell MCa may store data respectively be voltages applied to the bit line BL and the word line WL.

Referring to FIG. 4B, a memory cell MCb may include a variable resistance Rb and a bi-directional diode Db. The variable resistance Rb may include a resistance material to store data.

The bi-directional diode Db may be connected between the variable resistance Rb and the bit line BL. The variable resistance Rb may be connected between the word line WL and the bi-directional diode Db. Positions of the bi-directional diode Db and the variable resistance Rb may be mutually switched. A leakage current flowing to a non-selected memory cell MC may be cut off via the bi-directional diode Db.

Referring to FIG. 4C, a memory cell MCc may include a variable resistance Rc and a transistor TR. The transistor TR may be a selecting element, that is, a switching element, which supplies or cuts off a current to the variable resistance Rc according to a voltage of the word line WL. In an embodiment of FIG. 4C, in addition to the word line WL, a source line SL adjusting a voltage level of both ends of the variable resistance Rc may be additionally included. The transistor TR may be connected between the variable resistance Rc and the bit line BL. The variable resistance Rc may be connected between the source line SL and the transistor TR. Positions of the transistor TR and the variable resistance Rc may be mutually switched. The memory cell MCc may be selected or unselected according to whether the transistor TR is driven by the word line WL on or off.

Figure 5:
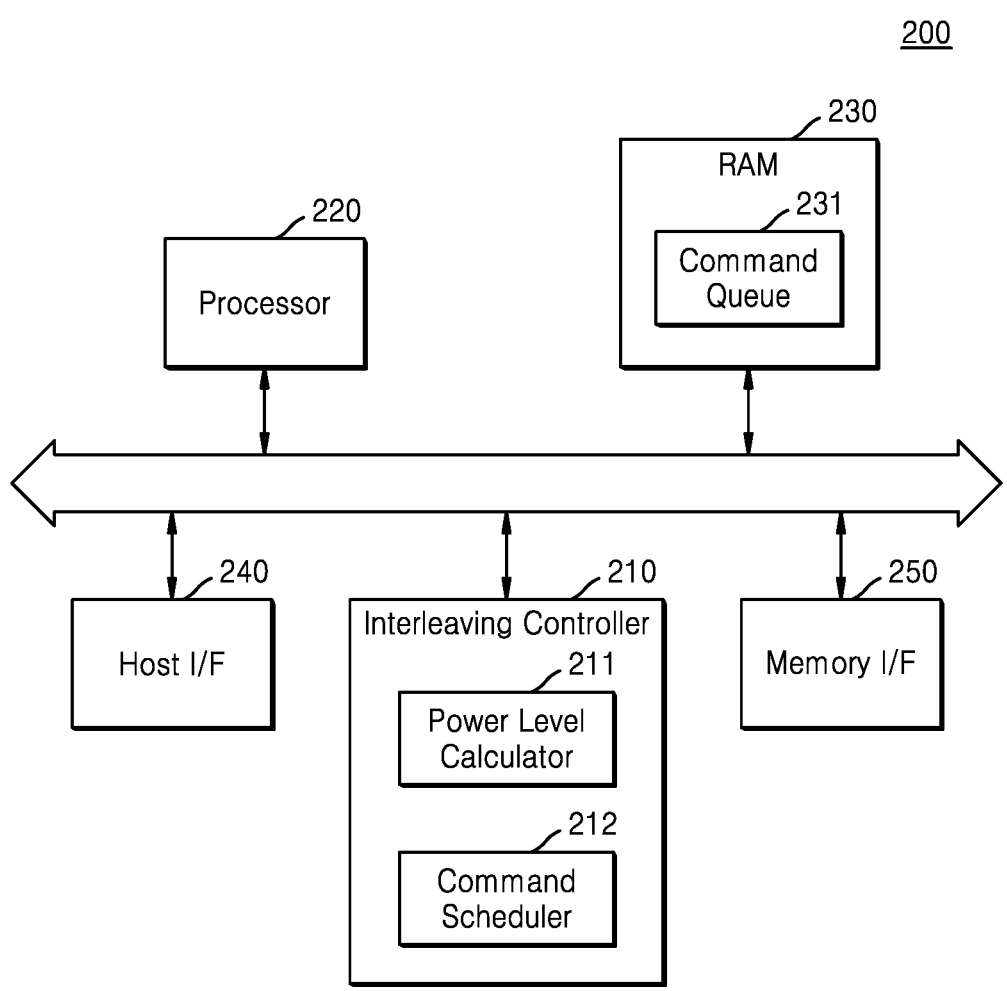
FIG. 5 is a block diagram of an example embodiment of a memory controller included in the memory system in FIG. 1.

FIG. 5 is a block diagram of an example embodiment of the memory controller 200 included in the memory system 10 in FIG. 1.

Referring to FIG. 5, the memory controller 200 may include the interleaving controller 210, a processor 220, a random access memory (RAM) 230, a host interface 240, and a memory interface 250.

The interleaving controller 210 may include a power level calculator 211 and a command scheduler 212. The power level calculator 211 may calculate a level of write power to be consumed in response to each of the write commands as a plurality of write commands are provided to the memory device 100. For example, the power level calculator 211 may calculate a power level to be consumed due to a write operation with respect to a bank corresponding to each of the plurality of write commands. A method of calculating a power consumption level of a write operation by the power level calculator 211 will be described later with reference to FIG. 7.

The command scheduler 212 may manage a write/read request received from a host to improve the performance of the memory device 100. For example, a plurality of write commands may be enqueued into a command queue 231 according to a write request received from the host. The command scheduler 212 may provide a plurality of enqueued write commands to the memory device 100 in an in-order or out-of-order manner. According to an embodiment, a command scheduler 212 may schedule the plurality of enqueued write commands based on the level of write power calculated by the power level calculator 211. The command scheduler 212 may adjust a timing of providing the plurality of enqueued write commands to the memory device 100. A scheduling method of the command scheduler 212 may be described later with reference to FIG. 10.

The processor 220 may include a central processing device or a microprocessor, and may control an overall operation of the memory controller 200. For example, the processor 220 may be configured to drive software or firmware controlling the memory controller 200. The software or firmware may be loaded in the RAM 230 and driven. The RAM 230 may be used as an operation memory, a cache memory, or a buffer memory of the processor 220. In the RAM 230, write data to be written to the memory device 100 may be temporarily stored, and read data read out from the memory device 100 may also be temporarily stored.

In an embodiment, the command queue 231 may be stored in the RAM 230. A plurality of commands may be enqueued in the command queue 231 according to a write request received from the host. For example, write commands and read commands may be enqueued. In addition, pre-read commands generated by the interleaving controller 210 may be enqueued in the command queue 231. The command queue 231 will be described later with reference to FIG. 8A.

The host interface 240 interfaces with the host to receive requests of memory operations from the host. For example, the host interface 240 may receive various requests of reading and writing data from the host HOST and generate various internal signals executing memory operations with respect to the memory device 100 to respond the requests.

The memory interface 250 may provide an interface between the memory controller 200 and the memory device 100. For example, write data and read data may be transmitted to and received from the memory device 100 via the memory interface 250. In addition, the memory interface 250 may provide commands and addresses to the memory device 100. The memory interface 250 may also receive various information from the memory device 100 and provide the information to the memory controller 200.

FIG. 6 is a flowchart illustrating an operating method of the memory controller 200 according to an example embodiment.

Referring to FIGS. 1 and 6, in S10, the memory controller 200 may receive a write request and write data from the host HOST. Based on the received write request, the memory controller 200 may enqueue a plurality of write commands in a command queue.

In S20, the interleaving controller 210 of the memory controller 200 may determine whether a number of the enqueued write commands exceeds a reference value. In an embodiment, the interleaving controller 210 may determine whether a number of write commands corresponding to different banks exceeds a reference value.

At this time, the reference value may indicate a maximum value of a number of banks accessible at the same time according to an interleaving operation, assuming that a level of write power consumed in one bank is the maximum when a write operation according to a write command is performed. For example, when a maximum level of power consumed by the memory device 100 in the interleaving operation of the write operation is 32 and a maximum level of the write power consumed in writing to one bank according to the write command is 8, the reference value is 4.

In S30, when the number of the enqueued write commands does not exceed the reference value, the interleaving controller 210 may control the memory device 100 to perform an interleaving operation according to the enqueued write commands.

The interleaving controller 210 may control the memory device 100 to perform the interleaving operation with respect to the enqueued write commands without previously calculating power consumption according to the write operation. For example, the interleaving controller 210 may send the enqueued write commands to the memory device 100 in parallel when the number of enqueued write commands does not exceed the reference value, the memory device 100 may not exceed an upper limit of the level of power that may be consumed in the interleaving operation, regardless of the level of write power actually consumed in different banks in the write operation in response to each of the write commands.

In S40, when the number of enqueued write commands exceeds the reference value, the interleaving controller 210 may calculate the level of write power consumed in the memory device 100 in response to at least some of the write commands. For example, the number of enqueued write commands may be 10 and a number of the at least some of the write commands may be 6 as shown in FIG. 9. S40 will be described later in detail with reference to FIG. 7.

In S50, the interleaving controller 210 may schedule, based on the level of write power calculated in S40, interleaving commands executing an interleaving operation. The interleaving commands may be at least some write commands of the enqueued write commands. S50 will be described later in detail with reference to FIG. 10. In the figure, S40 and S50 are shown to be performed sequentially, but the operating method of the memory controller 200 according to the inventive concept is not limited thereto. The S40 and S50 may overlap and be performed in parallel.

In S60, the memory controller 200 may control the memory device 100 to perform an interleaving operation with respect to the write commands, based on the scheduled interleaving commands executing the interleaving operation. For example, the memory controller 200 may transmit the scheduled interleaving commands to the memory device 100 in a row.

The operating method of the memory controller 200 according to the embodiment of the inventive concept, the memory controller 200 may determine whether or not to perform S40 and S50 according to the number of enqueued write commands. Therefore, operational time of the memory controller 200 (by avoiding unnecessary performance of S40 and S50) may be reduced.

In addition, when the number of enqueued write commands exceeds the reference value, the memory controller 200 may schedule the write operations according to power to be consumed due to the write operations, such that the number of write commands to perform the interleaving operation may be increased and power consumption of the memory device 100 due to the write operations may be more efficiently managed.

FIG. 7 is a flowchart illustrating a method used by the memory controller 200 according to an example embodiment and illustrating an example embodiment of S40 in FIG. 6.

Referring to FIGS. 5 to 7, in S410, the interleaving controller 210, for example, the power level calculator 211 may select at least some write commands to calculate power from among the enqueued write commands. The following operations (S420 to S490) may be performed with respect to each of selected some write commands in S410. In example embodiments, the power level calculator 211 may calculate write power for only selected write commands from among enqueued write commands. Thus, write speed and/or power consumption of the memory device 100 can be improved.

In S420, the power level calculator 211 may check whether there is a read command with respect to a target bank, the read command preceding the selected write commands. For example, the power level calculator 211 may check whether the read command with respect to the target bank is currently pending or whether the memory device 100 is performing a read operation according to the read command. At this time, the target bank may indicate a target bank of one of the selected write commands. In S420, the power level calculator 211 may check whether there is the read command with respect to each of the selected write commands.

In S430, when there is no read command with respect to the target bank, the read command preceding the selected write command, the power level calculator 211 may check whether there is another write command with respect to the target bank of the selected write command, preceding the selected write command. When there is no read command or other write command with respect to the target bank, the read or write command preceding the selected write command, S440 and S450 may be performed.

In S440, the power level calculator 211 may generate a pre-read command. At this time, the pre-read command may be a read command with respect to an address to which the write data corresponding to the selected write command is to be written.

In S450, the power level calculator 211 may compare pre-read data read by pre-read command with the write data corresponding to the selected write command to calculate a level of write power to be consumed.

Since the memory device 100 performs a data comparison write (DCW) operation, when the write command is received, the memory device 100 may compare data which is previously written and existed with write data to be written and perform an overwrite operation only with respect to a memory cell having other data. A size of power consumed due to the write operation may differ according to a difference between the existing data and the write data. Therefore, the power level calculator 211 may compare the pre-read data with the write data after generating and providing the pre-read command to the memory device 100 and calculate the power level to be consumed by the write operation based on the difference between the pre-read data and the write data.

When there is another write command preceding the selected write command, S460 may be performed. In S460, the power level calculator 211 may calculate the level of write power to be consumed due to the write operation by assuming the level of write power is a maximum value without generating a pre-read command. When another write operation with respect to the target bank to perform a write operation is already being performed, the write operation by the selected write command may be performed after the write operation being performed is completed. Therefore, to improve write latency or data bandwidth of the memory device 100, the interleaving controller 210 may calculate the level of write power in the power level calculation S40 by assuming the level of write power has the maximum value without generating the pre-read command, in which case there is a possibility of the bank conflict.

When there is a read command preceding the selected write command, S470 may be performed. In S470, the power level calculator 211 may confirm whether a row address corresponding to the read command is identical to a row address corresponding to the selected write command. For example, in S470, the power level calculator 211 may confirm whether a page corresponding to the read command is identical to a target page corresponding to the selected write command. When the page corresponding to the read command is identical to a target page corresponding to the selected write command, it may be referred to as "page hit."

In S480, when the row address corresponding to the read command is different from the row address corresponding to the selected write command, the power level calculator 211 may assume the level of write power to be consumed due to the write operation is the maximum value without generating the pre-read command. When another read operation with respect to the target bank to perform a read operation is already being performed, the write operation with respect to the selected write command may be performed after the read operation being performed is completed. Therefore, to improve write latency or data bandwidth of the memory device 100, the interleaving controller 210 may assume that the power consumption level has a maximum value without generating the pre-read command in power level calculation S40, in which case there is a possibility of a bank conflict, and may perform a command scheduling operation based on the power level having the maximum value in a later operation (for example, S50 in FIG. 6).

When the row address corresponding to the selected write command is identical to the row address corresponding to the read command, S490 may be performed. For example, when the target page of the selected write command is the same as the page corresponding to the read command, S490 may be performed. In S490, the power level calculator 211 may compare read data read in response to the read command with the write data to calculate the level of write power to be consumed due to the write operation. Since the read command with respect to the target page corresponding to the selected write command has already been previously performed, the power level calculator 211 may not need to generate a separate pre-read command to calculate the write power level. The power level calculator 211 may use the read data to calculate the power level to be consumed due to the write operation of the selected write command. In an embodiment, when the read data read due to the read command is stored in the RAM 230 of the memory controller 200, S490 may be performed immediately after S480 is performed. In an embodiment, when the read command with respect to the target page is pending in the command queue 231 or when the read command is provided to the memory device 100 but the read data has not yet been received by the memory controller 200, S490 may be performed after waiting for a certain time after S480 is completed.

In example embodiments, the command scheduler 212 may perform scheduling the enqueued write commands based on the level of write power calculated by the power level calculator 211 before ending of calculating the level of write power for all of the selected write commands by the power level calculator 211. For example, the command scheduler 212 may perform scheduling some of the write commands while the power level calculator 211 calculates the level of write power corresponding to some of the write commands.

FIG. 8A is a table illustrating example embodiments of the command queue 231 in FIG. 5. FIG. 8B is a table illustrating example embodiments of a command queue in which pre-read commands generated by the interleaving controller 210 in FIG. 5 by performing S440 in FIG. 7 are enqueued;

Referring to FIGS. 5 and 8A, a plurality of commands may be enqueued in the command queue 231 according to a write request received from the host. The command queue 231 may include a write command queue 231_1 in which write commands are enqueued and a read command queue 2312 in which read commands are enqueued.

In an embodiment, commands may be enqueued in the write command queue 231_1 and the read command queue 231_2 in an order in which the write request and read request are received from the host. For example, first to tenth write commands WCMD0 to WCMD9 may be sequentially enqueued in the write command queue 231_1 according to an order in which a write request is received from the host. A first read command RCMD0 and a second read command RCMD1 may be sequentially enqueued in the read command queue 231_2 according to an order in which a read request is received from the host. The write command queue 231_1 and the read command queue 231_2 shown in FIG. 8A are only examples to explain an operation of the interleaving controller 210 included in the memory controller 200. The operating method of the memory controller of the inventive concept is not limited to FIG. 8A. Although FIG. 8A shows that the write command queue 231_1 and the read command queue 231_2 are separately configured, which are not limited thereto. As an example, read commands and write commands may be combined into one command queue 231.

S30 in FIG. 6 may be performed with respect to write commands from among the first to tenth write commands WCMD0 to WCMD9 which are enqueued in the write command queue 231_1 and do not exceed the reference value. In addition, S40 to S60 in FIG. 6 may be performed with respect to write commands which exceed the reference value. For example, when the reference value is 4, S30 may be performed with respect to the first to fourth write commands WCMD0 to WCMD3 which are relatively earlier enqueued, and S40 to S60 may be performed with respect to a remaining write commands WCMD5 to WCMD9.

Referring to FIGS. 8A to 8B, the interleaving controller 210 may perform S440 and S450 in conjunction with write commands without preceding read command or other preceding write command, for example, the fifth write command WCMD4, eighth write command WCMD7, ninth write command WCMD8, and tenth write command WCMD9. Pre-read commands pre_RCMD0, pre_RCMD1, pre_RCMD2, and pre_RCMD3 respectively corresponding to the write commands WCMD4, WCMD7, WCMD8, and WCMD9 may be generated as S440 is performed. The pre-read commands pre_RCMD0, pre_RCMD1, pre_RCMD2, and pre_RCMD3 may be enqueued in a pre-read command queue 231_2' in an order of corresponding write commands WCMD4, WCMD7, WCMD8, and WCMD9. Therefore, the command queue 231 in FIG. 5 may further include the pre-read command queue 231_2'.

FIG. 9 is a diagram for explaining an example embodiment of S30 in FIG. 6 and S40 in FIG. 7 and showing calculated values, by the power level calculator 211, of levels of write power corresponding to each write command.

Referring to FIGS. 8A, 8B, and 9, for example, a level of write power due to a write operation may be divided into eight levels (level 1 to level 8), and the higher the level, the higher the power consumed. However, this is just an example and the level of write power may be variously subdivided.

The power level calculator (211 in FIG. 5, for example) of the interleaving controller 210 may calculate a level of write power respectively corresponding to write commands WCMD0 to WCMD3, which do not exceed the reference value (for example, the reference value is assumed to be 4), among first to tenth write commands WCMD0 to WCMD 9 enqueued in a command queue as a maximum value (level 8). For example, the power level calculator 211 may calculate the level of write power respectively corresponding to the write commands WCMD0 to WCMD3 by assuming the level of write power as the maximum value (level 8) without performing S40 to S60 in FIG. 6 with respect to the first to fourth write commands WCMD0 to WCMD3.

The power level calculator 211 may calculate a level of write power with respect to at least some write commands WCMD4 to WCMD9 which exceed the reference value. For example, the levels of write power with respect to all of the write commands WCMD4 to WCMD9 exceeding the reference value may be calculated.

The power level calculator 211 may generate pre-read commands pre_RCMD0, pre_RCMD1, pre_RCMD2, and pre_RCMD3 corresponding to the fifth, eight, ninth, and tenth write commands WCMD4, WCMD7, WCMD8, and WCMD9 which do not have preceding read commands or other preceding write commands (S440 in FIG. 7). The pre-read commands pre_RCMD0, pre_RCMD1, pre_RCMD2, and pre_RCMD3 are provided to the memory device 100 in advance of the fifth, eighth, ninth, and tenth write commands WCMD4, WCMD7, WCMD8, WCMD9, and the power level calculator 211 may compare write data with pre-read data received by the pre-read commands pre_RCMD0, pre_RCMD1, pre_RCMD2, and pre_RCMD3 to calculate the level of write power. For example, the level of write power respectively corresponding to the fifth, eighth, ninth, and tenth write commands WCMD4, WCMD7, WCMD8, and WCMD9 may be respectively calculated in 3, 4, 4, and 3 levels.

The power level calculator 211 may assume the level of write power with respect to the sixth write command WCMD5 in which another preceding write command with respect to the target bank exist as a maximum value (level 8) to calculate the level of write power (S460 in FIG. 7)

In addition, when there is a preceding read command RCMD1 and a bank BANK 6 corresponding to the read command RCMD1 is the same as a target bank BANK 6 corresponding to a seventh write command WCMD6, in particular, when a page corresponding the read command RCMD1 is the same as the target page corresponding to the seventh write command WCMD6, the power level calculator 211 may compare the read data read by the read command RCMD1 with the write data corresponding to the seventh write command WCMD6 to calculate the level of write power (S490 in FIG. 7). For example, the level of write power corresponding to the seventh write command WCMD6 may be calculated as level 6.

However, unlike what is shown in S490 of FIG. 7, when the bank corresponding to the preceding read command is the same as the target bank corresponding to the seventh write command WCMD6 but the page corresponding to the preceding read command RCMD1 is different from the target page corresponding to the seventh write command WCMD6, the power level calculator 211 may assume the level of write power as the maximum value (level 8) to calculate the level of write power (S480 in FIG. 7).

Figure 10:
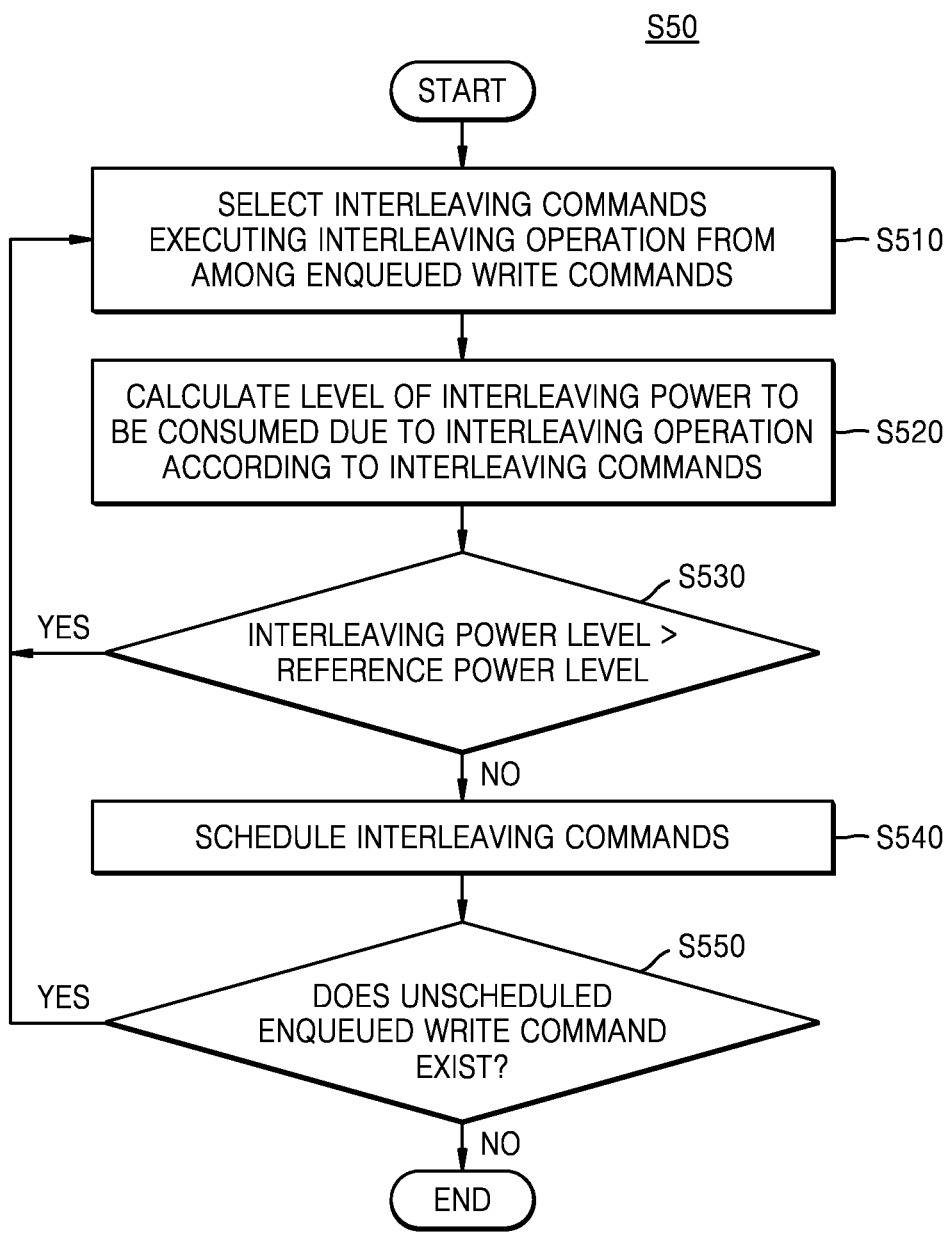
FIG. 10 is a flowchart illustrating an operating method of a memory controller according to an example embodiment and illustrating an example embodiment of S50 in FIG. 6.

FIG. 10 is a flowchart illustrating an operating method of the memory controller 200 according to an example embodiment and illustrating an example embodiment of S50 in FIG. 6.

Referring to FIGS. 5 and 10, in S510, the interleaving controller 210, for example, the command scheduler 212 in FIG. 5 may select interleaving commands among write commands enqueued in the command queue 231 to perform an interleaving operation. For example, the interleaving commands may be at least a portion of the enqueued write commands.

In S520, the command scheduler 212 may calculate an interleaving power level to be consumed due to the interleaving operation according to the interleaving commands. For example, the command scheduler 212 may sum up levels of write power to be consumed in the memory device 100 due to write operations according to each of the interleaving commands to calculate an interleaving power level.

In S530, the command scheduler 212 may determine whether the calculated interleaving power level exceeds a reference power level. The reference power level may be set to a maximum power level available when the memory device 100 performs a write operation to a plurality of banks according to the interleaving operation.

When the interleaving power level does not exceed the reference power level, in S540, the command scheduler 212 may schedule the interleaving commands. For example, the command scheduler 212 may schedule the interleaving commands to enable the interleaving commands to be sent sequentially to the memory device 100.

Meanwhile, when the interleaving power level exceeds the reference power level, the command scheduler 212 may reselect the interleaving commands executing the interleaving operation among the write commands enqueued in the command queue 231 to satisfy the reference power level when returning to S510. For example, the command scheduler 212 may exclude at least one of the previously selected interleaving commands to select other interleaving commands. Alternatively, for example, the command scheduler 212 may exclude at least one of the previously selected interleaving commands and select another write command that was not selected as the interleaving command.

In S550, the command scheduler 212 may check whether there is an unscheduled enqueued write command. When there is an unscheduled enqueued write command, the command scheduler 212 may perform S510 to S540 again.

The operating method of the memory controller 200 according to the inventive concept may control the interleaving operation in consideration of the interleaving power level due to the interleaving operation of a plurality of write commands after preliminarily calculating the level of write power according to each of the write commands. Therefore, a number of write commands to perform the interleaving operation may be increased to reduce a time needed for the write operation and a power consumption of the memory device 100 due to the write operation may be efficiently managed.

Figure 11:
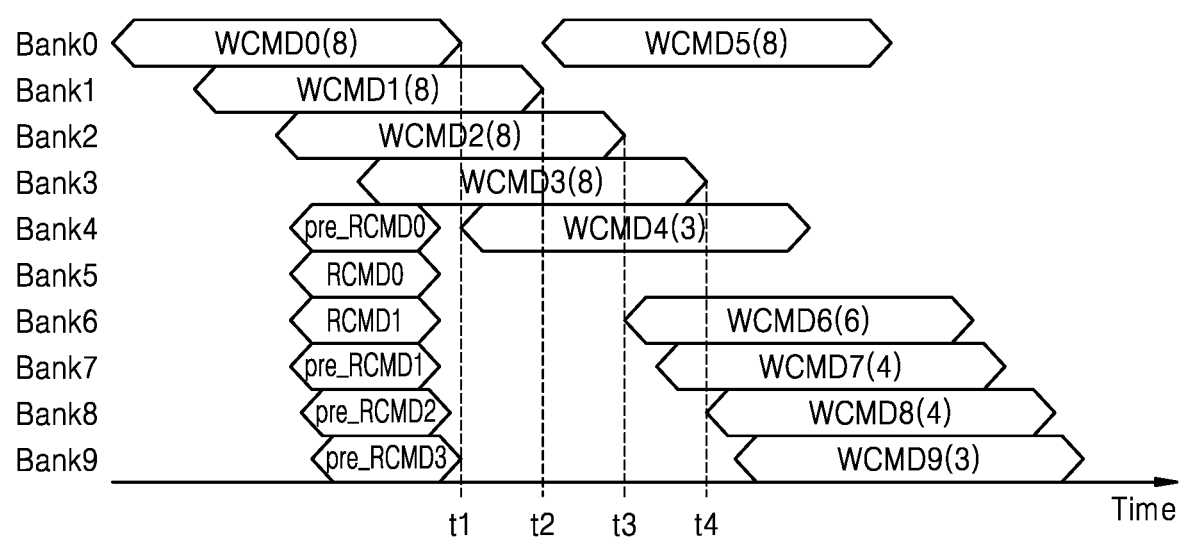
FIG. 11 is a timing diagram for explaining an example embodiment of S50 in FIG. 10.

FIG. 11 is a timing diagram for explaining an example embodiment of S50 in FIG. 10. FIG. 11 is a diagram illustrating a time in which target banks perform a write operation or read operation according to commands to be transmitted to the memory device 100.

Referring to FIGS. 9, 10 and 11, the command scheduler (212 in FIG. 5, for example) may schedule first to fourth write commands WCMD0 to WCMD3 that do not exceed the reference value (for example, 4) among first to tenth write commands WCMD0 to WCMD9 enqueued in a command queue to perform an interleaving operation. For example, the command scheduler 212 may schedule the first to fourth write commands WCMD0 to WCMD3 such that the memory controller 200 may sequentially transmit the first to fourth write commands WCMD0 to WCMD3 to the memory device 100, and the memory device 100 may simultaneously perform write operations according to the first to fourth write commands WCMD0 to WCMD3 during some period.

In S510, the command scheduler 212 may select the fifth write command WCMD4 together with the first to fourth write commands WCMD0 to WCMD3. In S520, a calculated interleaving power level is level 35 (8+8+8+8+3) and exceeds the reference power level (e.g., level 32). Therefore, the command scheduler 212 may schedule the fifth write command WCMD4 to be provided to the memory device after a time point t1 at which the write operation according to the first write command WCMD0 is ended. For example, the command scheduler 212 may schedule the second to fifth write commands WCMD1 to WCMD4 such that the memory controller 200 may sequentially transmit the second to fifth write commands WCMD1 to WCMD4 to the memory device 100, and the memory device 100, after the time point t1, may simultaneously perform write operations according to the second to fifth write commands WCMD1 to WCMD4 during some period.

Again in S510, the command scheduler 212 may select the sixth write command WCMD5 together with the second to fifth write commands WCMD1 to WCMD4. In S520, the calculated interleaving power level is level 35 (8+8+8+3+8) and exceeds the reference power level 32. The memory device 100 may perform interleaving operation according to the third to fifth write commands WCMD2 to WCMD4 together with the sixth write command WCMD5 after a time point t2 at which the write operation according to the second write command WCMD1 is ended. Therefore, the command scheduler 212 may schedule the sixth write command WCMD5 to be provided to the memory device after the time point t2 at which the write operation according to the second write command WCMD1 is ended. For example, the command scheduler 212 may schedule the third to sixth write commands WCMD2 to WCMD5 such that the memory controller 200 may sequentially transmit the third to sixth write commands WCMD2 to WCMD5 to the memory device 100, and the memory device 100, after the time point t2, may simultaneously perform write operations according to the third to sixth write commands WCMD2 to WCMD5 during some period.

Again in S510, the command scheduler 212 may select the seventh write command WCMD6 together with the third to sixth write commands WCMD2 to WCMD5. In S520, the calculated interleaving power level is level 33 (8+8+3+8+6) and exceeds the reference power level 32. The memory device 100 may perform interleaving operation according to the fourth to sixth write commands WCMD3 to WCMD5 together with the seventh write command WCMD6 after a time point t3 at which the write operation according to the third write command WCMD2 is ended. Therefore, the command scheduler 212 may schedule the seventh write command WCMD6 to be provided to the memory device 100 after the time point t3 at which the write operation according to the third write command WCMD2 is ended.

Again in S510, the command scheduler 212 may select the eighth write command WCMD7 together with the fourth to seventh write commands WCMD3 to WCMD6. In S520, the calculated interleaving power level is level 29 (8+3+8+6+4) and has a power level equal to or less than the reference power level 32. Therefore, the command scheduler 212 may schedule the seventh write command WCMD6 and the eighth write command WCMD7 to be provided to the memory device after the time point t3 at which the write operation according to the third write command WCMD2 is ended. For example, the command scheduler 212 may schedule the fourth to eighth write commands WCMD3 to WCMD7 such that the memory controller 200 may sequentially transmit the fourth to eighth write commands WCMD3 to WCMD7 to the memory device 100, and the memory device 100, after the time point t3, may simultaneously perform write operations according to the fourth to eighth write commands WCMD3 to WCMD7 during some period.

Again in S510, the command scheduler 212 may select the ninth write command WCMD8 together with the fourth to eighth write commands WCMD3 to WCMD7. In S520, the calculated interleaving power level is level 33 (8+3+8+6+4+4) and exceeds the reference power level 32. The memory device 100 may perform interleaving operation according to the fifth to eighth write command WCMD4 to WCMD7 together with the ninth write command WCMD8 after a time point t4 at which the write operation according to the fourth command WCMD3 is ended. Therefore, the command scheduler 212 may schedule the ninth write command WCMD8 to be provided to the memory device after the time point t4 at which the write operation according to the fourth write command WCMD3 is ended.

Again S510, the command scheduler 212 may select the tenth write command WCMD9 together with the fifth to ninth write commands WCMD4 to WCMD8. In S520, the calculated interleaving power level is level 28 (3+8+6+4+4+3) and has a power level equal to or less than the reference power level 32. Therefore, the command scheduler 212 may schedule the ninth write command WCMD8 and the tenth write command WCMD9 to be provided to the memory device 100 after the time point t4 at which the write operation according to the fourth write command WCMD3 is ended. For example, the command scheduler 212 may schedule the fifth to tenth write commands WCMD4 to WCMD9 such that the memory controller 200 may sequentially transmit the fifth to tenth write commands WCMD4 to WCMD9 to the memory device 100, and the memory device 100, after the time point t4, the memory device 100 may simultaneously perform write operations according to the fifth to tenth write commands WCMD4 to WCMD9 during some period.

Figures 12A, 12B:
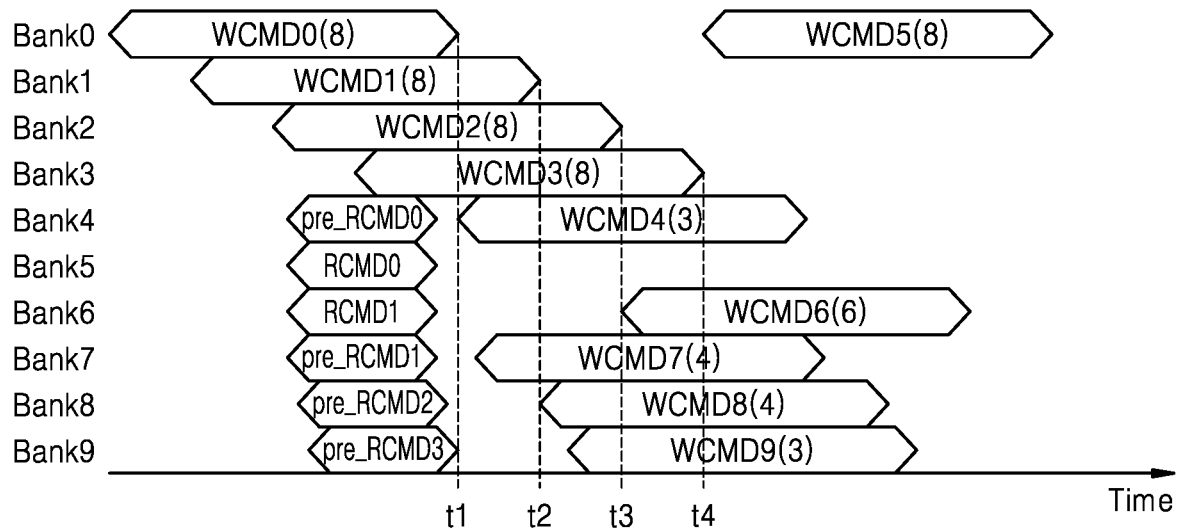
FIG. 12A is a timing diagram for explaining an example embodiment of S50 in FIG. 10.
FIG. 12B is a table of an example embodiment of the command queue in FIG. 5.

FIG. 12A is a timing diagram for explaining an example embodiment of S50 in FIG. 10. FIG. 12A is a diagram illustrating a time in which target banks perform a write operation or read operation according to commands to be transmitted to the memory device 100.

Referring to FIGS. 9, 10 and 12A, the command scheduler (212 in FIG. 5, for example), may schedule the first to fourth write commands WCMD0 to WCMD3 which do not exceed the reference value (for example, 4) among the first to tenth write commands WCMD0 to WCMD9 enqueued in a command queue to perform an interleaving operation. For example, the command scheduler 212 may schedule the first to fourth write commands WCMD0 to WCMD3 such that the memory controller 200 may sequentially transmit the first to fourth write commands WCMD0 to WCMD3 to the memory device 100, and the memory device 100 may simultaneously perform write operations according to the first to fourth write commands WCMD0 to WCMD3 during some period.

In S510, the command scheduler 212 may select the fifth write command WCMD4 together with the first to fourth write commands WCMD0 to WCMD3. In S520, a calculated interleaving power level is level 35 (8+8+8+8+3) and exceeds the reference power level 32. Therefore, the command scheduler 212 may schedule the fifth write command WCMD4 to be provided to the memory device 100 after a time point t1 at which the write operation according to the first write command WCMD0 is ended.

Again in S510, the command scheduler 212 may select the eighth write command WCMD7 together with the second to fifth write commands WCMD1 to WCMD4. In S520, the calculated interleaving power level is level 31 (8+8+8+3+4) and has a power level equal to or less than the reference power level 32. Therefore, the command scheduler 212 may schedule the fifth write command WCMD4 and the eighth write command WCMD7 to be provided to the memory device after the time point t1 at which the write operation according to the first write command WCMD0 is ended. For example, the command scheduler 212 may schedule the second to fifth write commands WCMD1 to WCMD4 and the eighth write command WCMD7 such that the memory controller 200 may sequentially transmit the second to fifth write commands WCMD1 to WCMD4 and the eighth write command WCMD7 to the memory device 100, and the memory device 100 after the time point t1, may simultaneously perform write operations according to the second to fifth write commands WCMD1 to WCMD4 and the eighth write command WCMD7 during some period.

When the write operation of the second write command WCMD1 is ended at a time point t2, the command scheduler 212 may further select the ninth write command WCMD8 and the tenth write command WCMD9 together with the third, fourth, fifth, and eighth write commands WCMD2 to WCMD4 and WCMD7 in S510 again. In S520, the calculated interleaving power level is level 30 (8+8+3+4+4+3) and has a power level equal to or less than the reference power level 32. Therefore, the command scheduler 212 may schedule the ninth write command WCMD8 and the tenth write command WCMD9 to be provided to the memory device 100 after the time point t2 at which the write operation according to the second write command WCMD1 is ended. For example, the command scheduler 212 may schedule the third to fifth write commands WCMD2 to WCMD4 and the eighth to tenth write commands WCMD7 to WCMD9 such that the memory controller 200 may sequentially transmit the third to fifth write commands WCMD2 to WCMD4 and the eighth to tenth write commands WCMD7 to WCMD9 to the memory device 100, and the memory device 100, after the time point t2, may simultaneously perform write operations according to the third to fifth write commands WCMD2 to WCMD4 and the eighth to tenth write commands WCMD7 to WCMD9 during some period.

When the write operation according to the third write command WCMD2 is ended at a time point t3, the command scheduler 212 may further select the seventh write command WCMD6 together with the fourth, fifth, eighth, ninth and tenth write commands WCMD3 and WCMD4 and WCMD7 to WCMD9 in S510 again. In S520, the calculated interleaving power level is level 28 (8+3+4+4+3+6) and has a power level equal to or less than the reference power level 32. Therefore, the command scheduler 212 may schedule the seventh write command WCMD6 to be provided to the memory device after the time point t3 at which the write operation according to the third write command WCMD2 is ended. For example, the command scheduler 212 may schedule the fourth and fifth write commands WCMD3 and WCMD4, the eighth to tenth write commands WCMD7 to WCMD9, and the seventh write command WCMD6 such that the memory controller 200 may sequentially transmit the fourth and fifth write commands WCMD3 and WCMD4, the eighth to tenth write commands WCMD7 to WCMD9 and the seventh write command WCMD6 to the memory device 100, and the memory device 100, after the time point t3, may simultaneously perform write operations according to the fourth and fifth write commands WCMD3 and WCMD4, the eighth to tenth write commands WCMD7 to WCMD9, and the seventh write command WCMD6 during some period.

When the write operation according to the fourth write command WCMD3 is ended at a time point t4, the command scheduler 212 may further select the sixth write command WCMD5 together with the fifth, eighth to tenth, and seventh write commands WCMD4, WCMD7 to WCMD9, and WCMD6 in S510 again. In S520, the calculated interleaving power level is level 28 (3+4+4+3+6+8) and has a power level equal to or less than the reference power level 32. Therefore, the command scheduler 212 may schedule the sixth write command WCMD5 to be provided to the memory device after the time point t4 at which the write operation according to the fourth write command WCMD3 is ended. For example, the command scheduler 212 may schedule the fifth, eighth to tenth, seventh, and sixth write commands WCMD4, WCMD7 to WCMD9, WCMD6, and WCMD5 such that the memory controller 200 may sequentially transmit the fifth, eighth to tenth, seventh, and sixth write commands WCMD4, WCMD7 to WCMD9, WCMD6, and WCMD5 to the memory device 100, and the memory device 100, after the time point t4, may simultaneously perform write operations according to the fifth, eighth to tenth, seventh, and sixth write commands WCMD4, WCMD7 to WCMD9, WCMD6, and WCMD5 during some period.

Referring to FIGS. 11 and 12A, the operating method of the memory controller 200 according to the inventive concept may control the interleaving operation in consideration of the interleaving power level due to the interleaving operation of a plurality of write commands after preliminarily calculating the level of write power according to each of the write commands. Therefore, a number of banks accessible to be used at the same time through an interleaving operation may be increased without being limited to a particular value. In addition, a power consumption of the memory device 100 due to the write operation may be efficiently managed.

FIG. 12B is a table of an example embodiment of the command queue 231 in FIG. 5 and is a diagram explaining a command queue changed according to an operation of the command scheduler described in FIG. 12A.

Referring to FIGS. 8A, 12A, and 12B, the command scheduler 212 may calculate the interleaving power level to be consumed in advance and schedule the interleaving commands. The command scheduler 212 may control a write command queue 231_1' in FIG. 12B in which an order of at least some write commands included in the write command queue 231_1 in FIG. 8A are changed. The write command queue 231_1 in FIG. 8A may be a write command queue in which the first to tenth write commands WCMD0 to WCMD9 are sequentially stored according to an order in which write requests are received from the host. Alternatively, the write command queue 231_1' in FIG. 12B may be newly stored to transmit the seventh write command WCMD6 after transmitting the tenth write command WCMD9 to the memory device 100, and transmit the sixth write command WCMD5 after transmitting the seventh write command WCMD6 to the memory device 100. The memory controller 200 may transmit a write command to the memory device 100 based on an order of write commands being enqueued in the write command queue 231_1' in FIG. 12B.

While the inventive concept has been particularly shown and described with reference to embodiments thereof, it will be understood that various changes in form and details may be made therein without departing from the spirit and scope of the following claims.

What is claimed is:

1. An operating method of a memory controller for controlling a memory device comprising a plurality of banks, the operating method comprising:
   determining whether a number of write commands enqueued in a command queue of the memory controller exceeds a reference value;
   calculating a level of write power to be consumed by the memory device in response to at least some of the write commands from among the enqueued write commands in response to the number of enqueued write commands exceeding the reference value; and
   scheduling, based on the calculated level of write power, interleaving commands executing a first interleaving operation of the memory device, from among the enqueued write commands,
   wherein the calculating of the level of write power comprises:
   selecting at least some of the write commands from among the enqueued write commands to calculate a power level corresponding to each of the selected write commands;
   checking whether there is a read command corresponding to a target bank of a first selected write command and preceding the first selected write command;
   generating a pre-read command preceding the first selected write command when there is no read command and write command both preceding the first selected write command; and
   comparing pre-read data read from the target bank of the memory device in response to the pre-read command with write data corresponding to the first selected write command to calculate the level of write power of the first selected write command.

2. The operating method of claim 1, further comprising: controlling a second interleaving operation of the memory device by sequentially transmitting the enqueued write commands to the memory device when the number of enqueued write commands does not exceed the reference value.

3. The operating method of claim 1, wherein the reference value is a maximum value of a number of banks accessible at the same time when a level of write power consumed in one bank according to a write operation has a maximum value.

4. The operating method of claim 1, wherein the determining of whether the number of enqueued write commands exceeds the reference value comprises determining whether the number of write commands corresponding to different banks as target banks in which data is written respectively from among the enqueued write commands exceeds the reference value.

5. The operating method of claim 1, wherein the calculating of the level of write power further comprises:
in response to determining there is no read command, checking whether there is a second write command corresponding to the target bank of the first selected write command and preceding the first selected write command; and
calculating the level of write power corresponding to the first selected write command as having a maximum value when there is the second write command preceding the first selected write command.

6. The operating method of claim 1, wherein the calculating of the level of write power further comprises:
when there is a read command preceding the first selected write command, checking whether a row address corresponding to the first selected write command and a row address corresponding to the read command are identical to each other.

7. The operating method of claim 6, wherein the calculating of the level of write power further comprises:
calculating the level of write power corresponding to the first selected write command as having a maximum value when the row address corresponding to the first selected write command is different from the row address corresponding to the read command.

8. The operating method of claim 6, wherein the calculating of the level of write power further comprises:
comparing read data read from the target bank of the memory device in response to the read command with write data corresponding to the first selected write command to calculate the level of write power of the first selected write command when the row address corresponding to the first selected write command is identical to the row address corresponding to the read command.

9. The operating method of claim 1, wherein, the scheduling of the interleaving commands comprises:
selecting interleaving commands executing the first interleaving operation, from among the enqueued write commands;
calculating, according to the selected interleaving commands, a level of interleaving power to be consumed in the memory device due to the first interleaving operation;
determining whether the level of interleaving power exceeds a reference power level; and
scheduling the interleaving commands when the level of interleaving power is equal to or less than the reference power level.

10. The operating method of claim 9, wherein the scheduling of the interleaving commands further comprises:
selecting interleaving commands executing a third interleaving operation when the level of interleaving power in the first interleaving operation exceeds the reference power level.

11. The operating method of claim 9, wherein, the reference power level is a maximum value of a power level available when the memory device performs a write operation to banks according to the first interleaving operation.

12. A memory controller for controlling an interleaving operation of a memory device comprising a plurality of banks, the memory controller comprising:
a power level calculator configured to calculate a level of write power to be consumed in the memory device in response to at least some of a plurality of write commands to be provided to the memory device; and
a command scheduler configured to schedule, based on the calculated level of write power, interleaving commands executing an interleaving operation of the memory device, from among the plurality of write commands,
wherein the power level calculator calculates the level of write power in response to a number of the plurality of write commands exceeding a reference value, and
wherein the power level calculator is further configured to:
check whether there is a read command corresponding to a target bank of a first selected write command and preceding the first selected write command,
generate a pre-read command preceding the first selected write command when there is no read command and write command both preceding the first selected write command, and
compare pre-read data read from the target bank of the memory device in response to the pre-read command with write data corresponding to the first selected write command to calculate the level of write power of the first selected write command.

13. The memory controller of claim 12, wherein the reference value is a maximum value of a number of banks accessible at the same time when the level of write power consumed in one bank according to a write operation has a maximum value.

14. The memory controller of claim 12, wherein, when there is another write command corresponding to the target bank of the first selected write command and preceding the first selected write command, the power level calculator calculates the level of write power corresponding to the first selected write command as having a maximum value.

15. The memory controller of claim 12, wherein, when there is a read command corresponding to a target page of the first selected write command and preceding the first selected write command, the power level calculator compares read data read from the target page of the memory device with write data corresponding to the first selected write command to calculate the level of write power.

16. A memory system comprising:
a memory device comprising a plurality of banks and configured to perform a data comparison write operation; and
a memory controller configured to control an interleaving operation of the memory device,
wherein the memory controller comprises:

a power level calculator configured to calculate a level of write power to be consumed in the memory device in response to at least some of a plurality of write commands to be provided to the memory device, and a command scheduler configured to schedule, based on the calculated level of write power, interleaving commands executing an interleaving operation of the memory device, from among the plurality of write commands, wherein the power level calculator calculates the level of write power in response to a number of the plurality of write commands exceeding a reference value, and wherein the power level calculator is further configured to:

check whether there is a read command corresponding to a target bank of a first selected write command and preceding the first selected write command, generate a pre-read command preceding the first selected write command when there is no read command and write command both preceding the first selected write command, and compare pre-read data read from the target bank of the memory device in response to the pre-read command with write data corresponding to the first selected write command to calculate the level of write power of the first selected write command.

17. The memory system of claim 16, wherein the memory device comprises a plurality of resistive memory cells.

* * * * *